US006907263B2

(12) United States Patent
Ho et al.

(10) Patent No.: US 6,907,263 B2
(45) Date of Patent: Jun. 14, 2005

(54) CELLULAR ANTENNA ARCHITECTURE

(75) Inventors: Chien-Hsun Ho, Taipei Hsien (TW); Yih-Jang Chen, Kao-Hsiung (TW); Kuo-Cheng Chen, Tainan Hsien (TW); Chien-Hua Ma, Hsin-Chu (TW)

(73) Assignee: High Tech Computer Corp., Tao-Yuan (TW)

( * ) Notice: Subject to any disclaimer, the term of this patent is extended or adjusted under 35 U.S.C. 154(b) by 295 days.

(21) Appl. No.: 10/248,787

(22) Filed: Feb. 19, 2003

(65) Prior Publication Data

US 2004/0204007 A1 Oct. 14, 2004

(30) Foreign Application Priority Data

Nov. 7, 2002 (TW) ....................................... 91132831 A

(51) Int. Cl.[7] .............................. H04B 1/38; H04M 1/00

(52) U.S. Cl. ................................. 455/552.1; 455/276.1

(58) Field of Search ........................... 455/550.1, 552.1, 455/73, 188.1, 182.1, 199.1, 275, 276.1; 343/725, 893, 895, 702

(56) References Cited

U.S. PATENT DOCUMENTS 5,437,055 A * 7/1995 Wheatley, III .............. 455/429
5,634,200 A * 5/1997 Kitakubo et al. ............. 455/82
5,717,406 A 2/1998 Sanderford et al.
5,920,292 A * 7/1999 O'Neill, Jr. ................. 343/895
5,977,916 A 11/1999 Vannatta et al.
6,239,747 B1 * 5/2001 Kaminski ................... 342/442
2003/0201939 A1 * 10/2003 Reece et al. ......... 343/700 MS
2004/0263413 A1 * 12/2004 Sutter et al. ................ 343/895
2004/0266378 A1 * 12/2004 Fukamachi et al. ...... 455/188.1

FOREIGN PATENT DOCUMENTS

| | | | |
|---|---|---|---|
| EP | 1 091 447 | A1 | 4/2001 |
| EP | 1137100 | A2 | 9/2001 |
| EP | 1 199 769 | A1 | 4/2002 |
| GB | 2380324 | A | 2/2003 |

* cited by examiner

*Primary Examiner*—Nick Corsaro
*Assistant Examiner*—Edan Orgad
(74) *Attorney, Agent, or Firm*—Winston Hsu

(57) ABSTRACT

An antenna architecture permitting tri-band and quad-band transmission and reception of GSM standardized frequencies in a mobile unit with a required gain without increasing power consumption. The mobile unit utilizes a control circuit to unify a first antenna and a second antenna, wherein the first antenna can operate in a first frequency and a second frequency and the second antenna can operate in a third frequency and a forth frequency. The control circuit includes a phase shift circuit for each antenna. The phase shift circuits prevent each antenna from loading the other antenna effectively eliminating excessive VSWR to increase gain.

14 Claims, 2 Drawing Sheets

CELLULAR ANTENNA ARCHITECTURE

BACKGROUND OF INVENTION

1. Field of the Invention

The present invention relates to a new antenna architecture used for. More specifically, an antenna architecture for the reception of tri-band and quad-band RF signals is disclosed.

2. Description of the Prior Art

The demand for wireless data services has become a critical part of life in modern society. Increasing numbers of users demand wireless capabilities of Internet access, email communication, video conferencing, and multimedia applications and make a wireless PDA (Personal Data Assistant) or a Smart Phone suitable devices to provide the data rates necessary for the new multimedia services.

In order to fulfill the customer's demand for wireless data services, multimedia devices such as PDAs and smart phones must provide a network that not only supports various content but also provides it in a seamless system that customers can rely on anywhere and anytime.

Take the most popular Global System for Mobile Communications (GSM) systems for example, the GSM systems are being standardized with specific frequency spectrums including 850 MHz, 900 MHz, 1800 MHz, and 1900 MHz. The lower two frequency spectrums are the oldest and most commonly used throughout the world. The 1800 MHz frequency range, or GSM 1800 (also called DCS 1800 and PCN (Personal Communication Network)) is found in an increasing number of countries throughout Europe and Asia. The 1900 MHz range, or GSM 1900 (also called DCS 1900, PCS 1900, and PCS (Personal Communication Services)) is used in the United States and Canada for GSM. A mobile unit with a tri-band or quad-band antenna architecture enabling clear sending and receiving of these different frequency spectrums holds a large commercial advantage of being compatible with more wireless data and multimedia systems.

The details of the factors influencing antenna design are well known in the art and need not be elaborated here. The efficiency of any antenna lies in a proper relationship between the size and shape of the antenna and the wavelength of the targeted frequency. As the number of targeted frequency ranges increases for any given antenna, the less efficient the antenna becomes. While a single-band antenna will nearly always outperform a dual-band antenna, acceptable results can be achieved in a properly designed dual-band antenna if the targeted frequency ranges are reasonably similar, for example 850 MHz and 900 MHz. Because optimum antennas for similar frequencies are of similar sizes, a good impedance match over both frequencies is possible and the Voltage Standing Wave Ratio (VSWR) affecting efficiency can be kept within reasonable limits of perhaps 2:1. On the other hand, if a single antenna is used with different, substantially non-harmonic frequencies, it is impossible to get a properly sized and impedance matched antenna for both frequency ranges and the VSWR climbs, rapidly reducing gain.

The specific frequency range that the antenna is designed to cover dictates the optimum size of an antenna. If the intended frequency range is too large or inappropriate for the antenna, signal reflections interfere with proper antenna functioning, result in loss of gain, and require additional power for adequate transmission or reception. Most mobile units are battery operated, cannot easily afford to waste power, and are consequently equipped with antennas properly matched for the intended frequencies. Therefore, a conventional mobile unit with properly tuned antenna can cover only a relatively narrow range of frequencies efficiently.

The mobile antenna architectures most commonly used today are of a planar type or a whip type and both perform well in dual-band roles. However, attempting to turn either type into a tri-band or quad-band antenna to utilize the four GSM frequencies enumerated above presents serious problems. First, a tri-band or quad-band antenna suffers from a high VSWR due to accommodating the required spectrums and bandwidths. Second, the high VSWR results in a low average gain, placing additional power concerns upon the mobile unit. Thirdly, a large size or a bad cosmetic design result if two planar or two whip structured antennas are used to accommodate the required frequency ranges.

Because of the drawbacks listed above, the current antenna architecture is neither feasible for wireless PDA or Smart Phone product development nor able to pass the output power and sensitivity test required by the GSM standard.

SUMMARY OF INVENTION

It is therefore a primary objective of the claimed invention to provide a new tri-band and quad-band antenna architecture with an improved ability to receive weak radio signals from cellular base stations and improved ability to transmit sufficient radio power to communicate with cellular base stations.

Briefly summarized, the claimed invention includes a mobile unit for use with a wireless communications system, more specifically a GSM cellular system. The mobile unit includes a first antenna operated at a first frequency and a second frequency, and a second antenna operated at a third frequency and a fourth frequency. The mobile unit uses a simple control circuit that unifies the two antennas, the two antennas acting together to enable tri-band or quad-band reception with a low VSWR and required gain. The control circuit includes a phasing circuit that can be of a transmission-line network type or of a lump inductive and capacitive network type and may be formed on the circuit board of the mobile unit with minimal cost. The control circuit forms a phase shift network to prevent the two antennas from loading each other.

It is an advantage of the claimed invention that the claimed invention provides improved operational abilities while taking advantage of the practical benefits associated with existing planar and whip antenna processing and a simple phases shift circuit. Such an architecture is suitable for low-cost mass production and commercial applications, is a lightweight configuration, has simplicity in power combining and splitting, and offers high resistance to mutual coupling techniques.

These and other objectives of the claimed invention will no doubt become obvious to those of ordinary skill in the art after reading the following detailed description of the invention, which is illustrated in the various figures and drawings.

DETAILED DESCRIPTION

Figure 1:
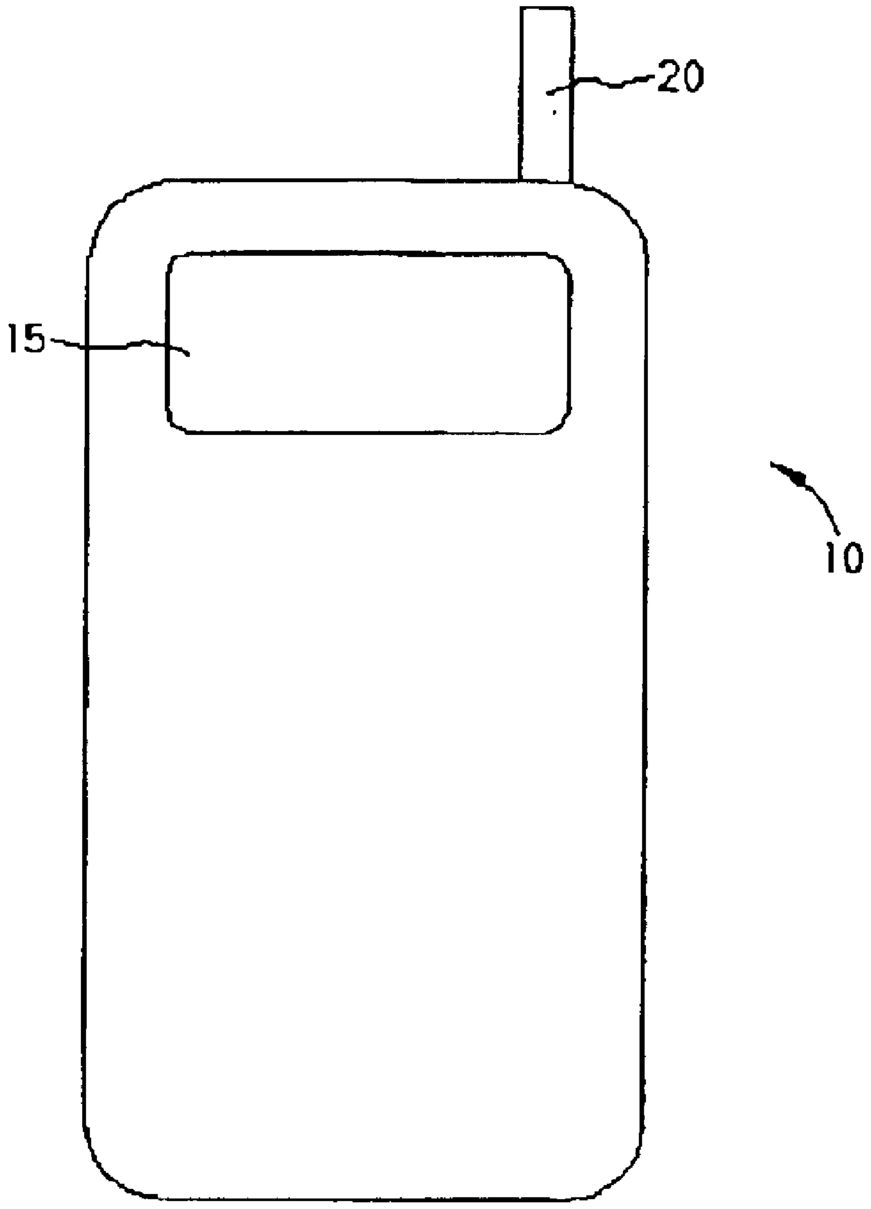
FIG. 1 is a simple drawing of an antenna architecture according to the present invention.

FIG. 1 is a simple concept drawing of part of an antenna architecture according to the present invention. A tri-band or quad-band mobile unit 10 comprises a planar antenna 15 disposed inside the mobile unit 10 and a whip antenna 20 protruding from the exterior of the mobile unit 10.

The planar antenna 15 is substantially 2-dimentional, comprises electrically conductive properties, is impedance matched with the transmitter and receiver, and is of a size and shape best suited to operate at a first frequency and a second frequency, such as 850 MHz and 900 MHz. Because the frequencies of 850 MHz and 900 Mhz are fairly similar, a single planar antenna 15 can be easily designed to offer a low Voltage Standing Wave Ratio (VSWR), a required average gain, and a compact size with low profile.

The whip antenna 20 also comprises electrically conductive properties, is impedance matched with the transmitter and receiver, and is of a size and shape best suited to operate at a third frequency and a fourth frequency, such as 1800 MHz (also called DCS 1800 and PCN (Personal Communication Network)) and the 1900 MHz range, or GSM 1900 (also called DCS 1900, PCS 1900, and PCS (Personal Communication Services)).

Figure 2:
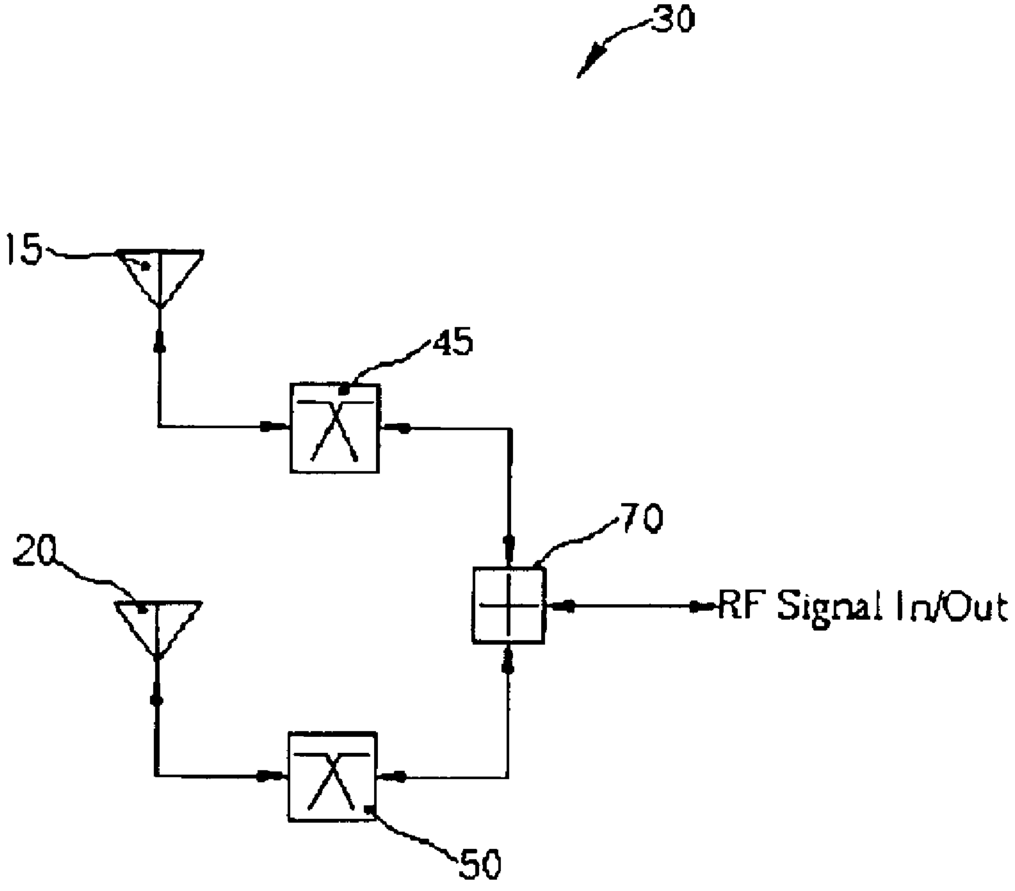
FIG. 2 is a diagram of an antenna selection circuit according to the present invention.

The mobile unit 10 also comprises a control circuit 30 shown in FIG. 2. The control circuit 30 comprises a first phase shift circuit 45 disposed between the planar antenna 15 and conventional RF circuitry inside the mobile unit 10. The control circuit 30 further comprises a second phase shift circuit 50 disposed between the whip antenna 20 and conventional RF circuitry 70. The two phase shift circuits 45 and 50 can be of a transmission-line network type or of a lump inductive and capacitive network type and may be formed on the circuit board of the mobile unit 10 with minimal cost. The control circuit 30 forms a phase shift network to prevent the two antennas 15 and 20 from loading each other, effectively combining the planar antenna 15 and the whip antenna 20 into a single antenna. The union results in a higher gain over all targeted frequencies because the union allows a better impedance match for each antenna, producing a lower Voltage Standing Wave Ratio (VSWR) than can be achieved with a conventional antenna and therefore reducing power consumption.

A second embodiment of the present invention differs from the first embodiment in that a second planar antenna disposed within the mobile unit 10 replaces the whip antenna 20. The control circuit 30 and the comprised phase shift circuits 45 and 50 perform the same functions as in the primary disclosure.

A third embodiment of the present invention differs from the first disclosure in that a second whip antenna protruding from the mobile unit 10 replaces the planar antenna 15. Again, The control circuit 30 and the comprised phase shift circuits 45 and 50 perform the same functions as in the primary embodiment.

It should be obvious that the pairing of the planar antenna 15 with the frequencies of 850 MHz and 900 Mhz and the pairing of the frequencies of 1800 MHz and 1900 MHz with the whip antenna 20 are merely design choices. The present invention is also intended to cover all permutations of the targeted frequency spectrums, meaning that each antenna can be used to cover frequencies other than those described in the primary embodiment. For example, pairing the whip antenna 15 with the frequencies of 850 MHz and 900 Mhz and pairing the frequencies of 1800 MHz and 1900 MHz with the planar antenna 20 also fall within the spirit of the invention.

In contrast to the prior art, the present invention permits tri-band and quad-band transmission and reception with a required gain without increasing power consumption in the mobile unit 10. Rates of power consumption are very critical in the mobile unit 10 because the mobile unit 10 is normally battery powered. The control circuit 30 unifies two antennas, each antenna optimized for a particular pair of frequency spectrums. The control circuit 30 comprises a phase shift circuit 45 and 50 corresponding to each antenna 15 and 20. The phase shift circuits 45 and 50 prevent the antenna 15 from loading the antenna 20 and the antenna 20 from loading the antenna 15. The antenna architecture of the present invention effectively eliminates excessive VSWR to increase gain.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A mobile unit for use in a wireless communication system comprising:

a first antenna capable of operating at a first frequency and a second frequency;

a second antenna capable of operating at a third frequency and a fourth frequency; and a control circuit for unifying the first antenna and second antenna comprising a phase shift circuit for preventing the first antenna from operating at the third frequency and the fourth frequency, and for preventing the second antenna form operating at the first frequency and the second frequency.

2. The mobile unit of claim 1 wherein the first antenna is of a planar type.

3. The mobile unit of claim 1 wherein the first antenna is of a whip type.

4. The mobile unit of claim 1 wherein the second antenna is of a planar type.

5. The mobile unit of claim 1 wherein the second antenna is of a whip type.

6. The mobile unit of claim 1 wherein the first frequency is 850 MHz.

7. The mobile unit of claim 1 wherein the second frequency is 900 MHz.

8. The mobile unit of claim 1 wherein the third frequency is 1800 MHz.

9. The mobile unit of claim 1 wherein the fourth frequency is 1900 MHz.

10. The mobile unit of claim 1 wherein the phase shift circuit is a transmission line network.

11. The mobile unit of claim 1 wherein the phase shift circuit is a lump inductive and capacitive network.

12. The mobile unit of claim 1 wherein the mobile unit is a PDA.

13. The mobile unit of claim 1 wherein the mobile unit is a Smart Phone.

14. The mobile unit of claim 1 wherein the wireless communication system is Global System for Mobile Communications (GSM) system.

* * * * *